(12) United States Patent
Mishra

(10) Patent No.: US 6,456,591 B1
(45) Date of Patent: *Sep. 24, 2002

(54) FAIR BANDWIDTH SHARING FOR VIDEO TRAFFIC SOURCES USING DISTRIBUTED FEEDBACK CONTROL

(75) Inventor: Partho Pratim Mishra, Summit, NJ (US)

(73) Assignee: AT&T Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/561,337

(22) Filed: Apr. 28, 2000

Related U.S. Application Data

(63) Continuation of application No. 08/555,534, filed on Nov. 9, 1995, now Pat. No. 6,075,768.

(51) Int. Cl.[7] .................. G01R 31/08; G08C 15/00; H04J 1/16
(52) U.S. Cl. .................. 370/229; 370/230; 370/233; 370/234; 348/189
(58) Field of Search ................. 370/229, 230, 370/231, 232, 233, 234, 235, 235.1, 236, 236.1, 396, 398, 230.1; 375/229, 240.03, 240.04, 240.06, 240.1, 240.24; 348/180, 189, 608, 184, 185, 192, 211, 222, 575, 576

(56) References Cited

U.S. PATENT DOCUMENTS

| | | | | |
|---|---|---|---|---|
| 5,134,476 A | * | 7/1992 | Aravind et al. | 348/415.1 |
| 5,136,376 A | * | 8/1992 | Yagasaki et al. | 375/240.23 |
| 5,408,465 A | * | 4/1995 | Gusella et al. | 370/231 |
| 5,633,859 A | * | 5/1997 | Jain et al. | 370/234 |
| 5,675,384 A | * | 10/1997 | Ramamurthy et al. | 375/240.04 |
| 5,835,149 A | * | 11/1998 | Astle | 375/240.05 |

* cited by examiner

*Primary Examiner*—Dang Ton
*Assistant Examiner*—Phirin Sam
(74) *Attorney, Agent, or Firm*—Morgan & Finnegan, LLP

(57) ABSTRACT

An apparatus and a method providing fair bandwidth sharing by adjusting video image quality in a data packet network comprises a network load detection means for detecting a network load and a video encoding control circuit. The network load has an uncongested state, a loaded state, and a congested state. The video encoding control circuit adjusts a video quality to a target video quality, by increasing the video quality when the network load is in the uncongested state and decreasing the video quality when the network load is in the congested state. The video quality is determined as a peak mean squared error between an uncompressed image and a corresponding decoded image. The network load is detected by using a forward explicit congestion notification bit.

10 Claims, 10 Drawing Sheets

FIG. 4

| STREAM | EXPT. 3.1 | | | EXPT. 3.2 | | |
|---|---|---|---|---|---|---|
| | FBS SCHEME | | RJ SCHEME | FBS SCHEME | | RJ SCHEME |
| | D = 42MS | D = 42/82MS | D = 42MS | D = 42MS | D = 42/82MS | D = 42MS |
| AUTUMN SCENE | 33.95 | 34.08 | 33.56 | 35.85 | 35.93 | 35.07 |
| BALL OF WOOL | 33.89 | 33.80 | 35.26 | 35.82 | 35.69 | 36.47 |
| KEIL HARBOUR | 33.87 | 33.83 | 31.95 | 35.80 | 35.88 | 33.81 |
| FERRIS WHEEL | 33.97 | 34.15 | 34.80 | 35.88 | 35.97 | 36.81 |
| HORSE RIDER | 33.93 | 33.93 | 35.52 | 35.84 | 35.93 | 36.81 |
| FAMILY PORTRAIT | 34.24 | 34.03 | 35.50 | 36.24 | 36.14 | 36.94 |

FIG. 9A

| | AVG. SNR | MIN. SNR | MAX. SNR |
|---|---|---|---|
| STREAM 1 | 33.97 | 31.25 | 42.55 |
| STREAM 2 | 33.89 | 31.24 | 41.58 |
| STREAM 3 | 33.84 | 31.24 | 41.58 |
| STREAM 4 | 33.91 | 31.24 | 41.27 |
| STREAM 5 | 33.98 | 31.24 | 41.18 |
| STREAM 6 | 34.00 | 31.24 | 41.24 |

SNR VALUES WITH FBS SCHEME OVER A LONG RUN

FIG. 9B

| STREAM | LINK UTILIZATION | QUEUE OCCUPANCY |
|---|---|---|
| AUTUMN SCENE | 33.58 | 34.55 |
| BALL OF WOOL | 33.70 | 34.49 |
| KIEL HARBOUR | 33.50 | 34.47 |
| FERRIS WHEEL | 33.60 | 34.57 |
| HORSE RIDER | 33.87 | 34.55 |
| FAMILY PORTRAIT | 33.86 | 34.85 |

AVG SNR VALUES WITH DEFFERENT CONGESTION INDICATORS

FAIR BANDWIDTH SHARING FOR VIDEO TRAFFIC SOURCES USING DISTRIBUTED FEEDBACK CONTROL

This is a continuation of application Ser. No. 08/555,534, filed Nov. 9, 1995, and now issued as U.S. Pat. No. 6,075,768 on Jun. 13, 2000.

FIELD OF THE INVENTION

This invention relates to systems for transmission and reception of digital video over packet switched networks, and more particularly to video signal encoding responsive to network feedback.

BACKGROUND OF THE INVENTION

In earlier work it has been shown that a promising approach for transporting real-time video traffic in packet switching networks is to use feedback from the network to modulate the source rate of a video encoder. However, a major problem exhibited by these earlier schemes is unfairness in the service provided to users—where the grade of service is defined in terms of the quality of the video signal delivered to the user.

Two distinct approaches are currently utilized for supporting real-time video over packet-switched networks. One approach is for the video encoder to produce a constant bit rate data stream with the network offering guarantees of constant bandwidth to each video connection. An alternative approach is to allow the encoder to generate a variable bit rate data stream, thereby allowing for more efficient use of network resources due to statistical multiplexing gains. Simple variable bit rate encoders operate in an open loop mode in which the value of the quantizer step size is kept constant, thereby assuring a constant quality video signal to end users, as long as there is no data loss. However, network overloads can cause data loss due to buffer overflows or excessive delays with a consequent degradation in image quality.

The degradation in image quality during overloads can be controlled by modulating the source bit rate of a video encoder based on the state of the network. This results in more efficient use of the network bandwidth and a more graceful degradation in image quality during periods of congestion. However, a drawback is that during periods of overload, sources with more complex image sequences see a greater reduction in image quality. A divergence in image quality of more than 5 dB between sources has been observed, resulting in clearly visible differences in the picture quality. This unfairness occurs because while more complex image sequences require a greater amount of bandwidth to obtain the same level of quality, the feedback control schemes attempt to achieve parity in the bandwidth used by each source.

There is a need for a new feedback control scheme that provides significantly greater fairness while still allowing for efficient usage of network bandwidth and graceful degradation in image quality under overloads.

SUMMARY OF THE INVENTION

In accordance with the present invention, an apparatus and a method provides fair bandwidth sharing by adjusting video image quality in a data packet network. The present invention comprises a network load detection means for detecting a network load and a video encoding control circuit. The network load has an uncongested state, a loaded state, and a congested state. The video encoding control circuit adjusts a video quality to a target video quality, by increasing the video quality when the network load is in the uncongested state and decreasing the video quality when the network load is in the congested state.

In an enhancement of the present invention, video quality is determined as a peak mean squared error between an uncompressed image and a corresponding decoded image.

In a further enhancement of the present invention, the network load is detected by using a forward explicit congestion notification bit.

A method in accordance with the present invention for allocating a data channel in a cable network is also described.

DESCRIPTION OF THE DRAWINGS

The present invention is described in detail below in conjunction with the drawings, of which:

FIG. 4 shows the average SNR;

FIG. 9A shows SNR values over a long run;

FIG. 9B shows average SNR values with different congestion indicators;

DETAILED DESCRIPTION OF VARIOUS ILLUSTRATIVE EMBODIMENTS

Although the present invention, an apparatus for fair bandwidth sharing in a data packet network is particularly well suited for use with an ATM network, and shall be described with respect to this application, the methods and apparatus disclosed here can be applied to other packet video networks as well.

The present invention is an apparatus for adjusting video image quality in a data packet network to provide Fair Bandwidth Sharing by adaptation of the quantization source rate of video encoders. This achieves fairness by using the image quality as the primary variable for modulation of encoder behavior in response to feedback signals from the network. The network feedback information used consists of a single bit of information about the aggregate load at the bottleneck link.

Feedback from the network is used to determine a target image quality, the video encoder then tries to match this target quality by adjusting the quantizer step size. The system used for determining the target image quality attempts to reduce the difference in quality between different video streams so that all streams converge to the same level of image quality. Since the video encoder bit rate is proportional to the image quality, modifying the image quality in response to network feedback also ensures that the amount of traffic submitted into the network tracks the available bandwidth.

System Configuration

Figure 1:
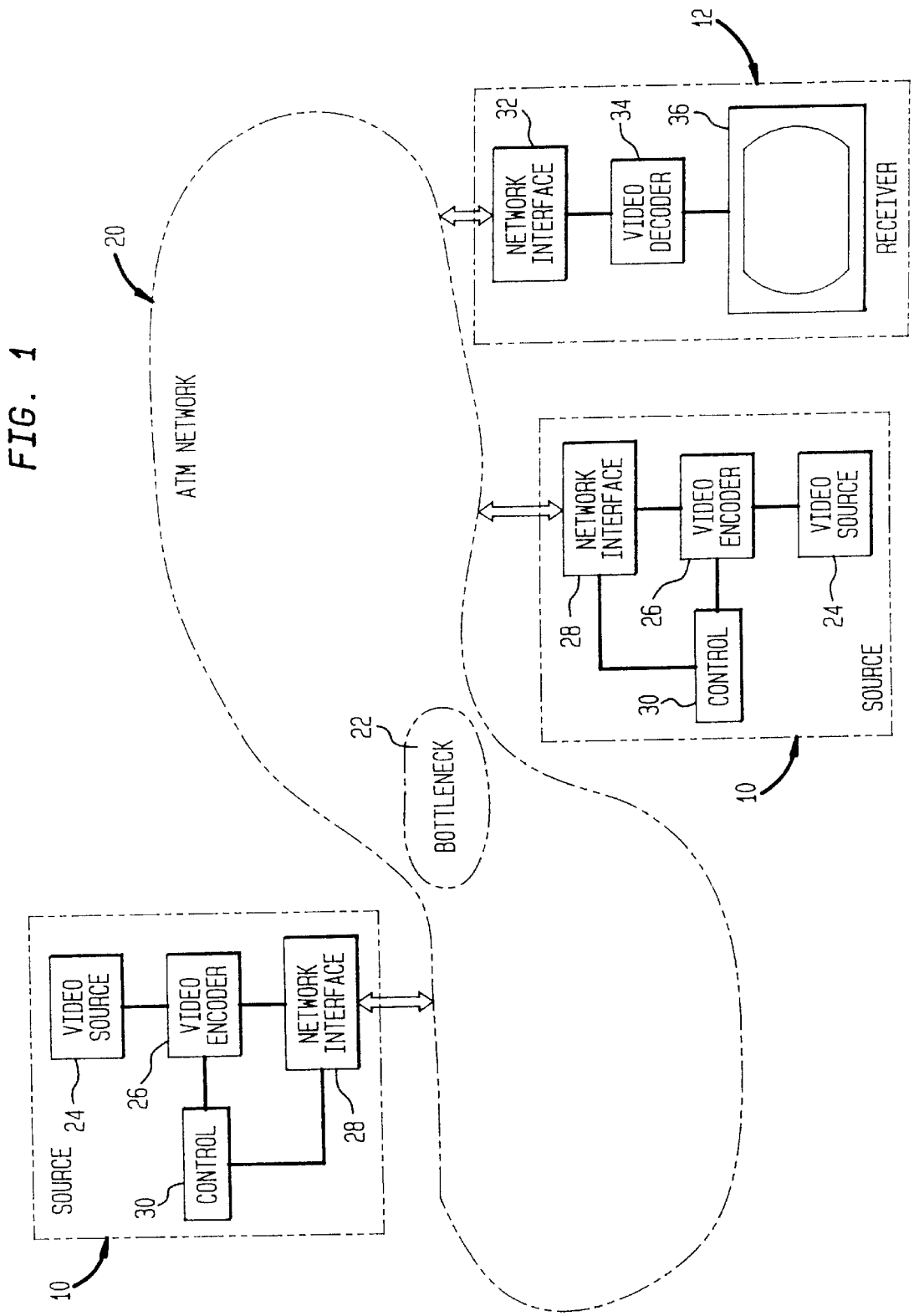
FIG. 1 shows a schematic illustration of a digital communication system capable of transferring digital video information among users.

Referring now to FIG. 1 there is shown a digital communication system capable of transferring digital video information among users. The system includes an ATM network 20. For the ATM network 20, a virtual-circuit routing model is used in which data for each individual connection is routed over a fixed path which is chosen at connection setup time. The ATM network 20 transports various classes of traffic, including data, voice and video, with network control mechanisms ensuring that the Quality of Service requirements of individual connections are maintained. Traffic for each individual connection within the ATM network 20 is limited by a bottleneck link 22. In a complex network, the location of the bottleneck link 22 may change in response to changes in user loads as well as network configuration.

One or more sources 10 of digital video signals are coupled to the ATM network 20. Each source 10 comprises a video source 24 coupled to a video encoder 26, such as a modified MPEG-1 variable bit encoder. The output of the video encoder 26 is coupled to the ATM network 20 through a network interface 28. A control mechanism 30 is coupled between the network interface 20 and the video encoder 26. The control mechanism 30 provides a control signal for adjusting the bit rate of the video encoder 30 in response to a state of a network load.

One or more receivers 12 are coupled to the ATM network 20. Each receiver 12 comprises a video display devices 36 coupled to a video decoder 34. The video decoder 34 is couple to the ATM network 20 through a network interface 32.

Quality of Service Requirements of Real-time Video

The primary Quality-of-Service standard of measurement for real-time video transmission is the signal quality of the video sequence decoded by a video decoder 34 at a receiver 36. This quality is sometimes quantified subjectively as a Mean Opinion Score, using ratings given by human observers under controlled conditions. However, objective measures of signal quality, typically in the form of signal-to-noise ratio (SNR) are more convenient to work with. A commonly used standard of measurement of quality for an individual image in a video sequence is the peak mean squared error (PMSE) between the uncompressed image and the corresponding decoded image or the equivalent peak signal-to-noise (PSNR) ratio.

$$PSNR = -10 \log_{10}(1/PMSE) \qquad \text{Equation 1.}$$

Equation 1 shows the relationship between the PMSE and the PSNR. The image quality decoded at the receiver 36 is usually poorer than the original uncompressed image at the video source 24. This is caused by the use of a quantization process during encoding to reduce the number of bits required to represent an image and when a packet is loss during transmission through the network. Because packet losses in the network are relatively infrequent, the quality of the decoded signal is dependent primarily on the quantization process at the video encoder 26. The effect of this process may be represented as a non-linear function shown in Equation 2.

$$Q = k_1 - k_2 * e^{-R/X} \qquad \text{Equation 2.}$$

Referring to Equation 2, Q is the image quality after quantization, X is the complexity of the source material, R is the number of bits used to represent the image, $k_1$ and $k_2$ are constants. For a simple variable bit rate encoder, Q is kept constant allowing the value of R to vary over time based on the complexity X of each encoded frame in the sequence. As long as a network is lightly loaded, it has the bandwidth available to carry the variable bit rate stream at a constant quality. However, under heavy loads, there could be packet loss due to buffer overflows or excessive delays, adversely affecting the Quality of Service as perceived by the user. This degradation in signal quality can be controlled by adapting the bit rate of a video encoder 28 to match the available network bandwidth.

Encoder Control Using Network Feedback

The feedback information and the source adaptation function together determine the performance of the overall system. Equation 2 shows that a video encoder 26 that is compressing more complex images requires a greater number of bits to obtain the same level of quality. Referring to Equation 3, at a particular time instant t, there is an aggregate bandwidth R(t) available to the set S of real-time video streams with the same bottleneck link. Ideally, each source i should generate traffic at a rate $R^i(t)$ such that the aggregate bandwidth is not exceeded and so that each compressed video stream has the same quality.

$$Q^i(t) = Q^j(t), \forall\, i, j \in S \qquad \text{Equation 3}$$
$$\sum_{i=1}^{i=n} R^i(t) \le R(t), n = |S|.$$

However, almost all the feedback based rate control mechanisms for variable bit rate video attempt to achieve a parity in rates, driving the sending rates of the sources 10 to an equilibrium state based on equal share of the bottleneck link 22. Equation 2 shows that this will result in streams corresponding to more complex images sequences seeing a greater reduction in quality of service. Moreover, even for the same video source 24, scene changes will cause the receiver 12 to see different levels of quality over time. Various feedback control schemes for real-time video divergence in PSNR values between different streams greater than 5 dB. Such a large difference in the PSNR value leads to significant differences in the perceptual quality.

Equations 2 and 3 provide a centralized solution in which each source 10 provides an estimate of its image complexity $X^i$ to the bottleneck link 22 which then computes the appropriate rate allocation for individual streams. However. this is hard to implement in a general packet switched network, because there is no simple quantitative measure of image complexity. Finally, since the image complexity is time-varying, because of scene changes, each source 10 will have to signal its new image complexity measure to the bottleneck link 22, whenever the scene changes, resulting in greater overhead.

A distributed solution allows each source 10 to make a local decision on how to modify its rate based on global feedback information from the ATM network 20. Following a change in the available network bandwidth, each source 10 uses the feedback to compute a target image quality level so as to reduce the difference in quality between different streams so that all streams converge to the same image quality level over time.

Expressing quality in terms of the PMSE value, an adaptation rule used for determing $E^i_{n+1}$, a target PMSE value for the $n+1^{th}$ frame of source i, is shown in Equation 4.

$$E^i_{n+1} = E^i_n - \gamma_1 \cdot (E^i_n - E_{\min}) \quad \text{if uncongested} \qquad \text{Equation 4}$$
$$= E^i_n \qquad \text{if loaded}$$
$$= E^i_n + \gamma_2 \cdot (E_{\max} - E^i_n) \quad \text{if congested.}$$

The primary goal with this control is to keep the bottleneck link 22 operating in the loaded region. Whenever there is a significant change in the bottleneck link 22 capacity, the feedback information will indicate, after a delay, transition from the loaded to the congested or uncongested state. As long as the bottleneck link 22 is uncongested, each source 10 tries to improve its quality level, by reducing the target PMSE. Similarly, each source 10 tries to reduce its quality level when the bottleneck link 22 is congested. Since the PMSE is inversely proportional to the required bandwidth (as shown by Equation 2), the control defined by Equation 4 ensures that the amount of traffic submitted into the network tracks the network state. The choice of $\gamma_1$ and $\gamma_2$ affects the dynamic response, i.e. the speed with which sources modify their bandwidth requirements when the bottleneck link 22 moves out of the loaded state into either the congested or the uncongested states.

When the bottleneck link 22 is in the uncongested state, sources 10 with poorer image quality increase the target image quality level more quickly. Similarly, when the bottleneck link 22 is in a congested state, sources 10 with higher image quality reduce their target levels more quickly. Consequently, the magnitude of the difference between the image quality levels of multiple sources 10 is reduced so as to drive the state of the system towards an equilibrium state in which all traffic sources sharing the same bottleneck link 22 have the same PMSE value.

The choice of 3 network states—congested, loaded and uncongested—for the control defined by Equation 4 was made to minimize the likelihood of constantly fluctuating, unstable, image quality. If the state of the bottleneck link 22 was characterized by only two states, congested and uncongested, each source 10 would be forced to modify its quality every time it coded a new frame, and thus would oscillate. The addition of a loaded state ensures that the quality adjustment occurs only when there is a transition from the loaded state. This allows the sources to stabilize at about the same quality level as long as there are no significant changes in the bandwidth availability. $E_{min}$ and $E_{max}$ are used to establish upper and lower bounds on the target PMSE values.

The control mechanism 30 used by the video encoder 26 to match the target PMSE value for a frame, adjusts the quantization step size on a per macroblock basis. Prior to coding each macroblock, an estimated PMSE value is determined for the frame, based on the number of macroblocks coded up to that point using a linear extrapolation rule. Then the quantization step size is selected. based on the difference between the target and estimated PMSE values. The encoder compensate for inaccuracies in the linear model as it encodes the macroblocks in a frame.

Figure 2:
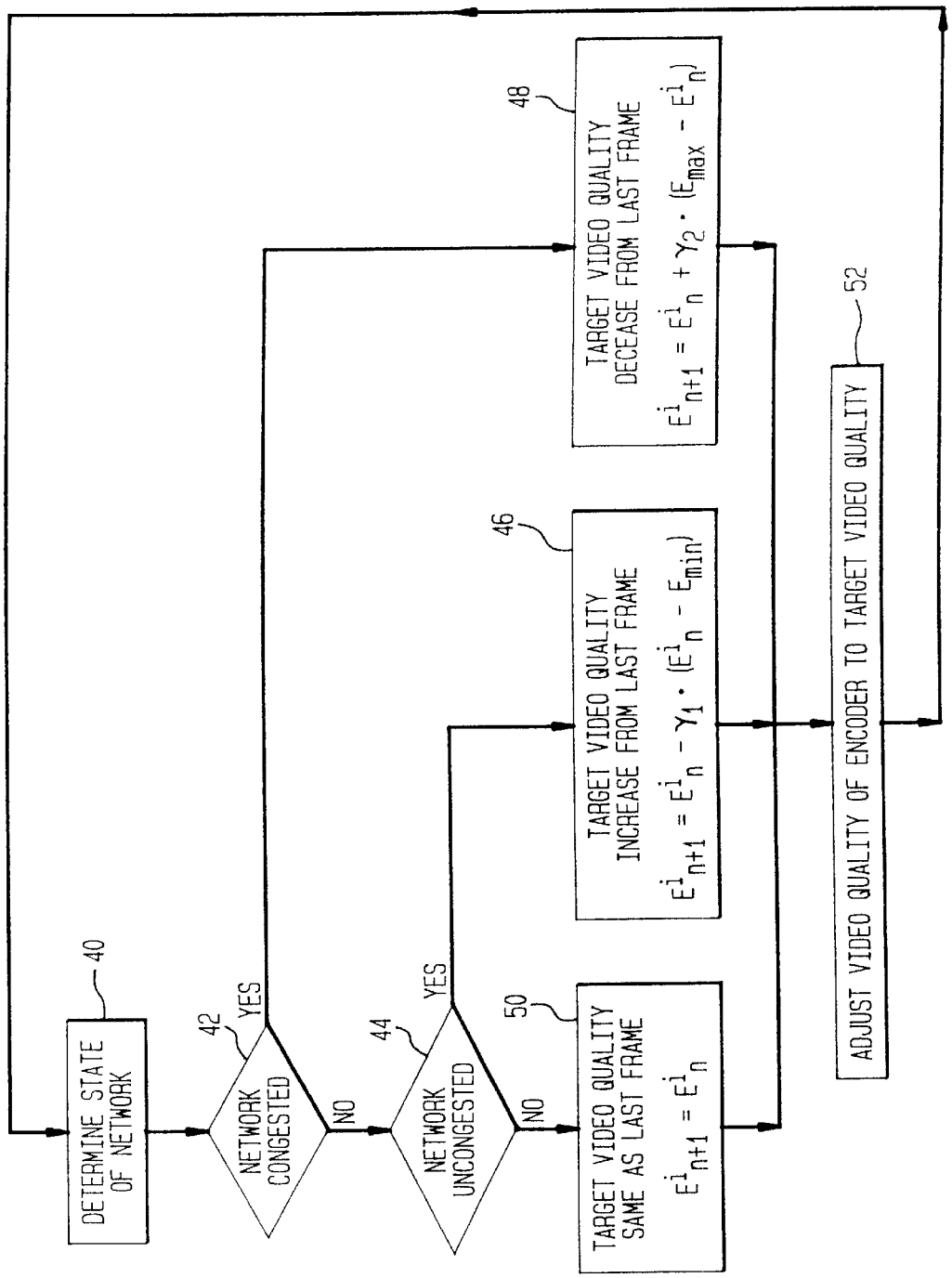
FIG. 2 shows a flow diagram of the control of the video quality of the encoder.

Referring to FIG. 2 there is shown a flow diagram for the control mechanism 30 for controlling the video quality of the encoder. The first step 40 is to determine the state of the network. The second step 42 is to evaluate the state of the network, to determine if the network is congested. If the evaluation in the second step 42 determines that the network is not congested then the third step 44 is to evaluate the state of the network to determine if the network is uncongested. If the evaluation of the third step 44 determines that the network is uncongested then the next step is to determine the target video quality increase from the last frame 46. If the evaluation of the second step 42 determines that the network is congested that the next step is to determine the target video quality decrease from the last frame 48. If the evaluation of the third step 44 determines that the network is not uncongested then the next step is to determine that the target video quality is the same as the last frame 50. The last step 52 is to adjust the quality of the encoded video to that of the target video. The process is repeated for each subsequent frame.

Signaling of Network State

A Forward Explicit Congestion Notification (FECN) bit is used to signal the state of the ATM network 20 to sources 10. In this scheme, a bit it set in the header of a data packet by each switch in its path. This allows network feedback information to be communicated without the overhead of special signaling packets. The bit can be set by network elements when they experience congestion. In the present invention, fair bandwidth sharing, the bits are set so as to provide more than simple binary information: a switch sets the congestion bit in a packet with a probability which depends on the current state of the output link. The state of the output link is measured by the link utilization and is quantified as being in one of three regions, congested, loaded or uncongested. The receiver 12 estimates whether the bottleneck link 22 is in the congested, loaded or uncongested state, based on the number of packets received with the bit set, and periodically reflects this information back to the source 10.

Although there is only one-bit available per packet, a receiver 12 can observe the bits set in a number of received packets over time. Whereby, a switch can convey more accurate information about any slow-varying quantity such as the queue size or the link utilization by encoding this information in a sequence of bits. When there are multiple switches in the connection path, each switch independently applies the operation described above. Assuming that the link utilization at non bottleneck switches is much less than the utilization at the bottleneck link 22, it is possible to choose the thresholds such that the stream of bits generated is influenced only by the evolution of the utilization at the bottleneck link 22.

RJ Scheme

The RJ scheme provides a comparison for the present invention, fair bandwidth sharing. The RJ scheme regulates the bit rate of an encoder without any consideration of image quality. For the RJ scheme, the originally proposed bit-setting technique was used in which the switch sets the bit in a packet if the instantaneous aggregate queue occupancy at the instant of packet transmission is more than a threshold T. The receiver periodically computes the fraction of the number of packets received with the bit set to the total number of packets received over the preceding frame duration. If more than 50% of the bits are set the receiver indicates network congestion to the source. When the source receives feedback information it computes a target frame size, $R_j$ for the next $j^{th}$ frame, as described in Equation 5.

$$R_j = R_{j-1} + \alpha \quad \text{if uncongested}$$
$$\phantom{R_j} = R_{j-1} * \beta \quad \text{if congested.}$$

Equation 5

Performance of the present invention, fair bandwidth sharing was observed with trace driven simulations. In the simulations, each traffic source is an encoder that implements standard MPEG-1 encoding augmented with the fair bandwidth sharing control mechanism or the RJ control. mechanism. The receiver 12 collects arriving packets into a buffer. At intervals of 33 ms, packets belonging to the current display frame are removed from the buffer and passed to the decoder 34. At these playback instants, the receiver 12 transmits its estimate of the network state, derived from the stream of cells received in the previous 33 ms, to the source 10. The decoder 34 outputs the actual image sequences which are used to compute various statistics such as the SNR values.

The uncompressed source traces used to drive the video encoders 26 correspond to a set of video image sequences that are typically used for evaluating video coding algorithms. These sequences include a harbor scene, a rider on a horse, a spinning Ferris wheel, etc. The picture size is 352 by 240 pixels and the frame rate is 30 frames per second. For most of the tests, six different sequences were used to generate traffic for each connection with the duration of the simulations being about 5 seconds (148 frames). To evaluate the performance of the fair bandwidth sharing scheme over a long time interval (240 seconds), a single sequence was used, which is a montage of outdoor scenes of wildlife. This sequence has approximately 7300 frames with about 12 scene changes and a picture size of 160 by 240 pixels.

In the network configuration that is used for the simulations, the propagation delays were chosen so that the round trip propagation delay for a first path is 42 ms and the round trip propagation delay for a second path is either 42 or 82 ms. In all the simulations, all six video sources share a common bottleneck link 22. Bursty data sources with Poisson arrivals were used to provide cross-traffic on the non-bottleneck links. The traffic from these sources is not flow-controlled and is serviced with the same priority at network switches as those from video traffic sources. The receiver 12, buffers a maximum of 132 ms (4 frames) of video data in its playback buffer for each connection. There is 200 Kbytes of buffers shared among all the active connections at the output queues of switches.

Three sets of tests were designed to study the performance of the fair bandwidth sharing scheme for plausible models of changes in the traffic intensity at the bottleneck link 22. In the first two sets of tests, the bandwidth available to the existing video traffic is abruptly reduced/increased. This models a situation where a group of new connections, routed through the bottleneck link 22, switch on simultaneously. This kind of sharp transition imposes a worst case stress on the transient behavior of feedback based control mechanisms. In the third set of tests, the increase and decrease of the available bandwidth is more gradual and is meant to model the statistical fluctuations in the traffic intensity of video traffic, for testing long-term statistical variations due to scene changes in the video sequences and the impact that this has on video quality.

The values of $\gamma_1$ and $\gamma_2$ used for most of the tests were 0.1 and 0.4 respectively. These values were picked to provide a rapid reduction in the source 10 bit rate when the ATM network 20 is congested and a gradual increase in the source 10 bit rate when the ATM network 20 is uncongested. The thresholds $T_{c-1}$ and $T_{1-u}$ used to delineate the uncongested. loaded and congested regions were 70% and 90% respectively. $E_{min}$ and $E_{max}$ were picked to result in PSNR values of 41.14 and 31.14 dB, which define the boundaries of acceptable quality levels. For the RJ scheme, the value of $\alpha$ was picked to be 20 Kbits while the value of $\beta$ was picked to be 0.875. The $\alpha$ and $\beta$ values were chosen to result in an aggregate rate of bandwidth increase/decrease which is comparable to that of the fair bandwidth sharing scheme.

Sudden Sharp Decrease in Bandwidth

Figure 3A:
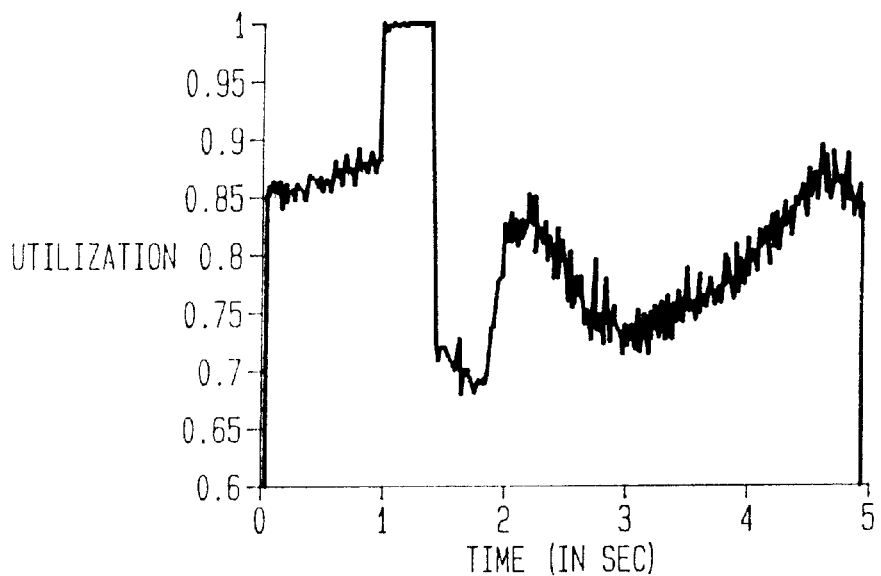
FIGS. 3A and 3B show link utilization and source bit rates with Fair Bandwidth Sharing.
Figure 3B:
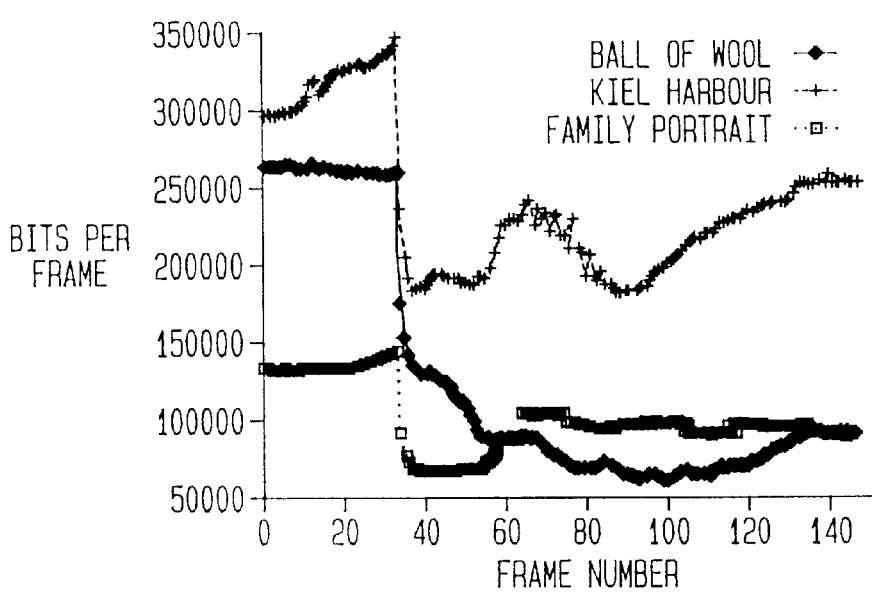

In the first test, the capacity of the bottleneck link 22 is abruptly reduced from 50 Mb/s to 30 Mb/s to induce congestion. This reduction in bandwidth occurs 1000 ms after the start of the simulation and lasts until the end of the simulation run. FIGS. 3A and 3B show the link utilization at the bottleneck for the above test: the value averaged over the whole run is 79%. The queue occupancy stays bounded at less than a few packets except for a brief spike following the steep reduction in bandwidth. Consequently, there are no packet losses despite the sudden steep reduction in bandwidth.

FIG. 4 shows the SNR values averaged over the entire run for the fair bandwidth sharing scheme and the RJ scheme. The magnitude of the difference in the SNR values between the streams with the best and the worst quality is 0.37 dB and 0.35 dB for the fair bandwidth sharing scheme with equal and unequal propagation delays, respectively. In contrast, for the RJ scheme the difference between the best and worst SNR values is as much as 3.57 dB. Such large differences in the SNR values are easily discernible by casual viewers.

Figure 5A:
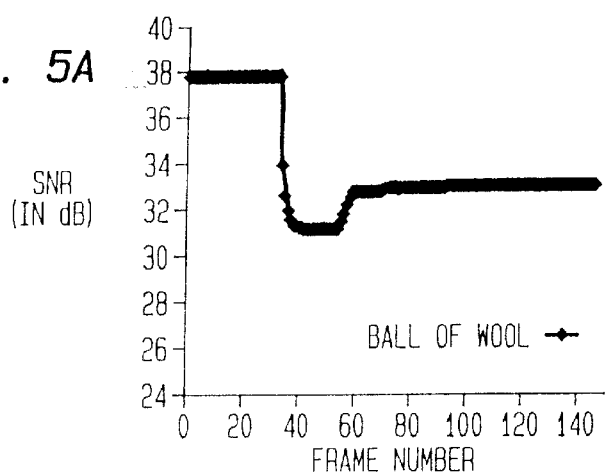
FIG. 5A shows the SNR for a ball of wool with Fair Bandwidth Sharing.
Figure 5B:
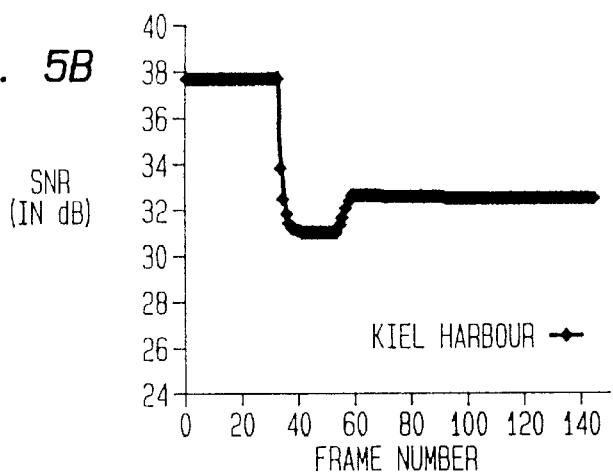
FIG. 5B shows the SNR for Kiel harbor with Fair Bandwidth Sharing.
Figure 5C:
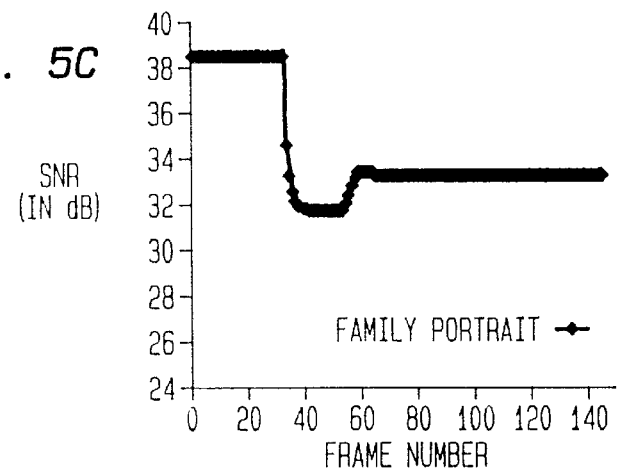
FIG. 5C shows the SNR for a family portrait with Fair Bandwidth Sharing.
Figure 6A:
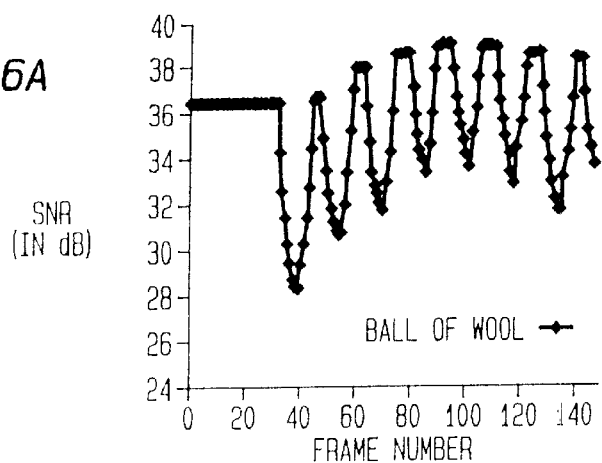
FIG. 6A shows the SNR for a ball of wool with RJ scheme.
Figure 6B:
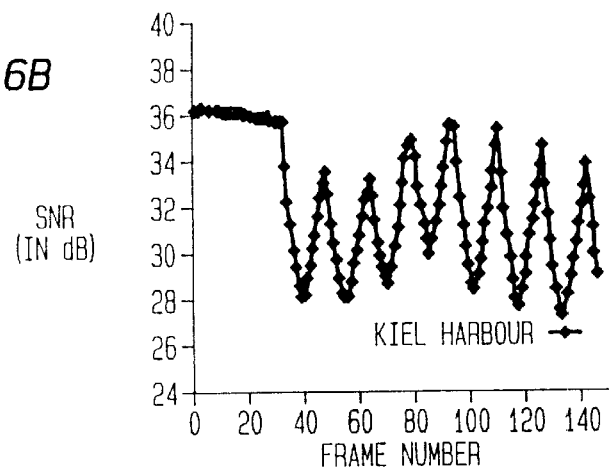
FIG. 6B shows the SNR for Kiel harbor with RJ scheme.
Figure 6C:
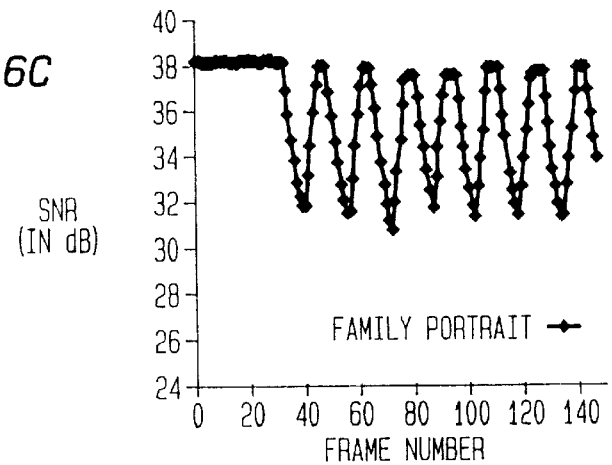
FIG. 6C shows the SNR for a family portrait with RJ scheme.

FIGS. 5A, 5B and 5C illustrate that the present invention, fair bandwidth sharing, causes each of the sources to converge to a new equilibrium state in which all streams see about the same quality, following the bandwidth reduction. This is achieved by allowing the bandwidth used by each stream to fluctuate over time to match the temporal image complexity variations of the input image sequences so as to keep the SNR values constant—see FIGS. 3A and 3B. FIGS. 6A, 6B and 6C show that convergence to a new equilibrium state is quick with the RJ scheme also. However, the target rates and therefore the SNR values oscillate with a large amplitude, with each source showing different characteristics with the resultant unfairness across streams. This kind of oscillatory behavior is not peculiar to the RJ scheme alone but may be observed with other schemes that use aggregate binary feedback as well.

Sudden Sharp Increase in Bandwidth

The capacity of the bottleneck link Bottleneck link 22 is initially 30 Mb/s and is abruptly increased to 50 Mb/s. As in the previous test, this increase in bandwidth occurs 1000 ms after the start of the simulation and lasts until the end of the simulation run.

Figure 7A:
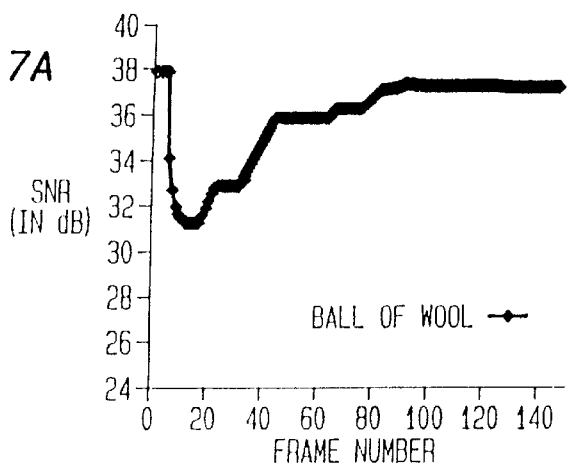
FIG. 7A shows the SNR for a ball of wool with Fair Bandwidth Sharing in an extended.
Figure 7B:
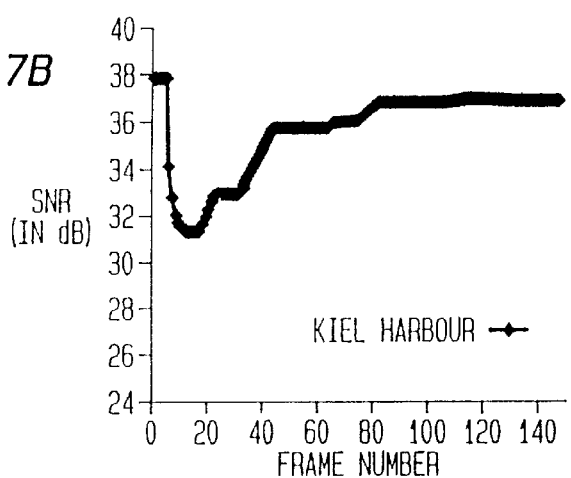
FIG. 7B shows the SNR for Kiel harbor with Fair Bandwidth Sharing.
Figure 7C:
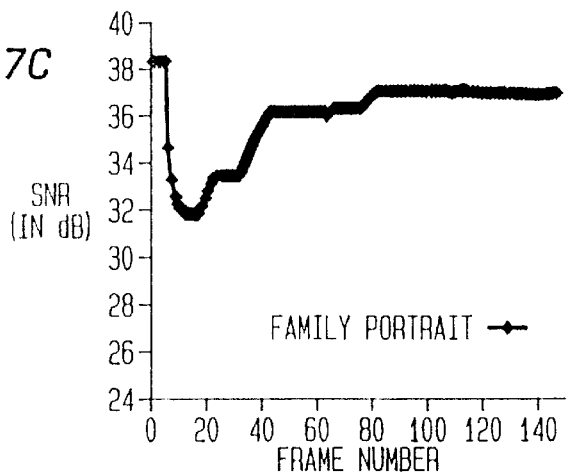
FIG. 7C shows the SNR for a family portrait with Fair Bandwidth Sharing.
Figure 8A:
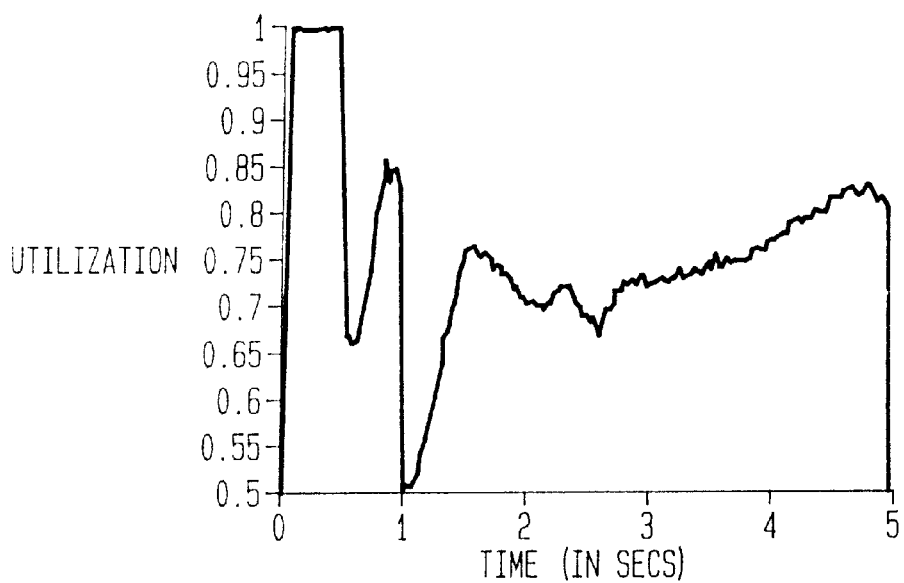
FIG. 8A shows link utilization with Fair Bandwidth Sharing.
Figure 8B:
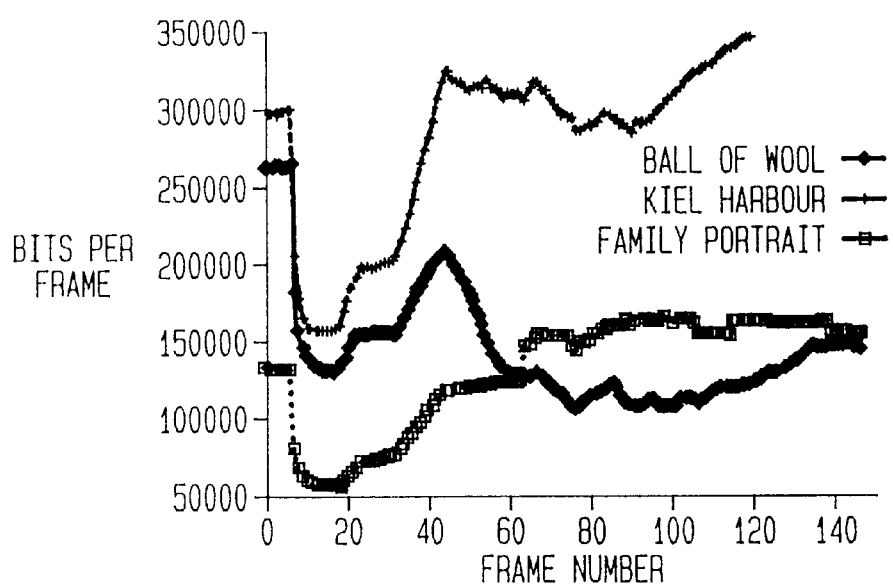
FIG. 8B shows source bit rates with Fair Bandwidth Sharing.

The aggregate bandwidth requirement when all the sources switch on (before feedback information is received by any of the sources) exceeds the bottleneck capacity. Hence, the SNR values decrease after the first few frames and stabilizes around 33 dB. Subsequently when the bottleneck link increases at 1000 ms, the sources adapt to the increased bandwidth causing the quality to improve: the SNR values increase up to between 36–37 dB (FIGS. 7A, 7B and 7C). As in the previous set of tests, the utilization of the bottleneck is high without any packet losses. Due to the values chosen for $\gamma_1$ and $\gamma_2$, the time taken to increase the sending rate following an increase in bandwidth is far more than the reverse transition—see FIGS. 3A, 3B, 8A and 8B. FIG. 4 shows that as with the previous test, the use of the fair bandwidth sharing scheme ensures that the average SNR values are within 0.5 dB of each other while with the RJ scheme, the range is more than 3 dB.

Gradual Changes in Bandwidth

The long term behavior of the present invention, fair bandwidth sharing, was observed for a single video sequence which is approximately 7300 frames long (243 seconds). The bandwidth requirement of this sequence is lower than for the sequences used earlier because the picture sizes are smaller (160×240 pixels). The simulation configuration is the same as in previous tests except that the capacity of the bottleneck link is 10 Mb/s at the start of the simulation. The video sequence used has about 12 scene changes. The same sequence is used to drive all 6 connections but with each source switching on at intervals of 200 frames starting at time 0. The new sources thus generated are independent since the autocorrelation coefficient observed for this video sequence is less than 0.1 at an interval of 200 frames. In addition to the changes in bandwidth requirement caused by the scene changes, the bandwidth of the bottleneck link is changed to M Mb/s every n ms, where M and n are uniformly distributed random variables over the intervals 5 to 15 Mb/s and 5 to 15 seconds, respectively. Thus there are more than 30 transitions due to the scene changes and bottleneck capacity changes.

FIGS. 9A and 9B summarize the results obtained in terms of the average SNR values for each of the connections—these values are computed over only that interval of time during which all the connections are active. The results show that despite the multiple transitions, the use of the present invention, fair bandwidth sharing, results in the average utilization averaged over the interval during which all the connections are active is 82%, there are no packets lost and the best and worst quality sequences (as measured by the average SNR values) differ by only 0.16 dB.

Sensitivity Analysis

Figure 10A:
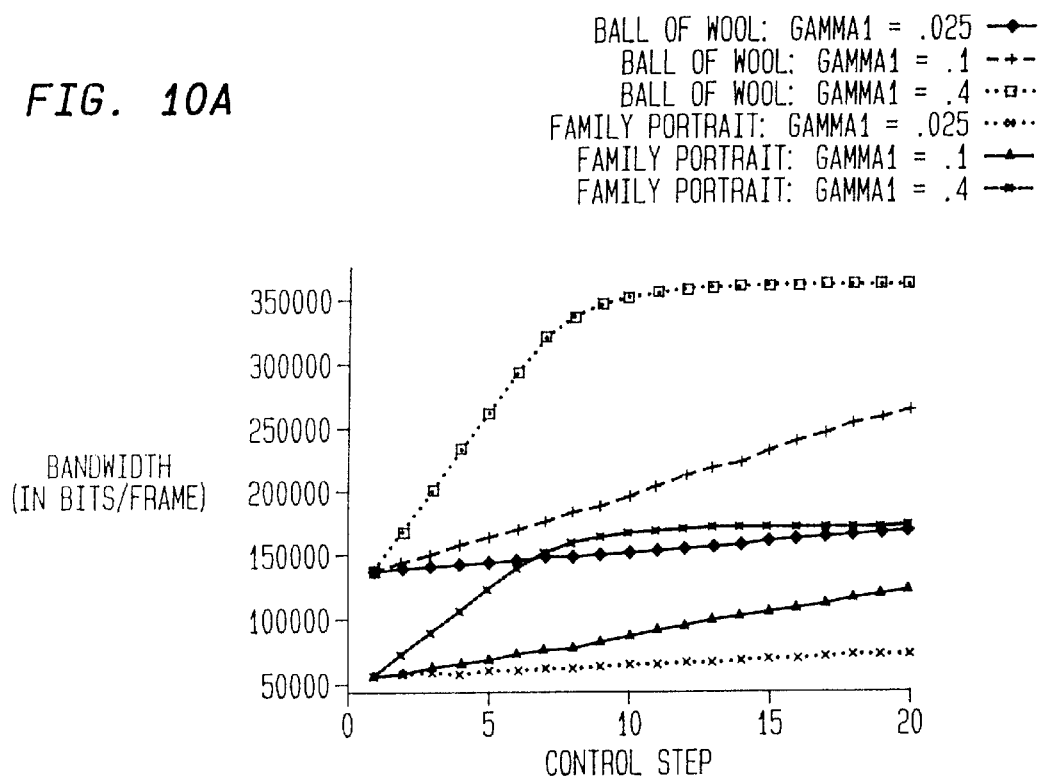
FIG. 10A shows the impact of the value of $\gamma_1$.
Figure 10B:
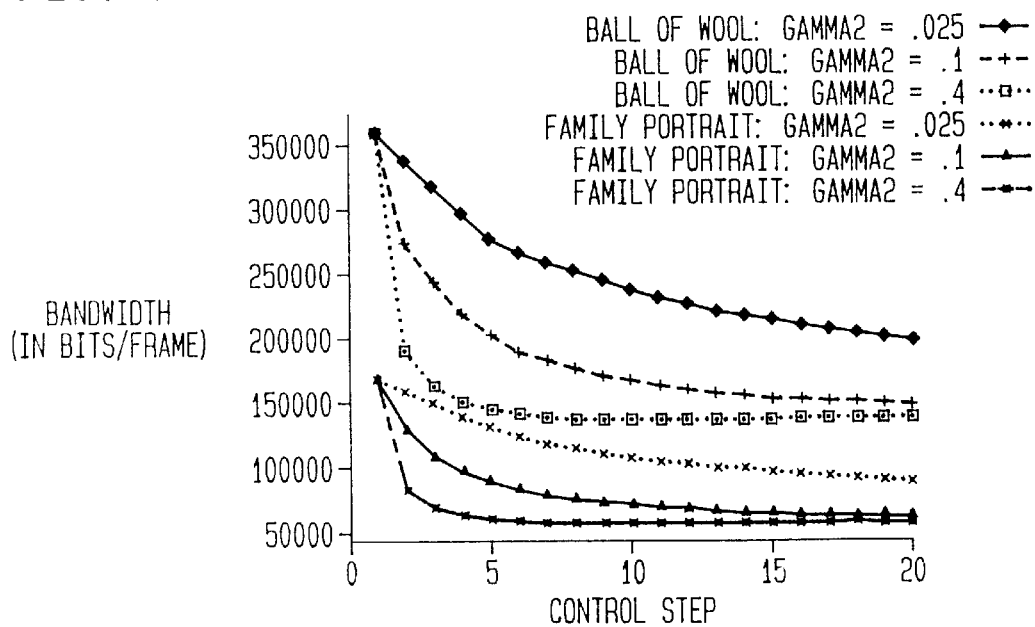
FIG. 10B shows the impact of the value of $\gamma_2$.

The performance of the present invention, fair bandwidth sharing, is affected by the values of $\gamma_1, \gamma_2, T_{c-1}$ and $T_{1-u}$. The value of $\gamma_2$ determines how rapidly active sources react to an decrease in capacity. A delay in reacting to a reduction in available bandwidth may cause packet losses. This can have a highly adverse impact on image quality specially when inter-frame encoding is used. In the present invention, fair bandwidth sharing, the amount by which a source reduces its bit rate when the feedback indicates network congestion, depends on the value of $\gamma_2$, the current quality level and the relationship between bandwidth and quality for the image sequence being coded. FIGS. 10A and 10B shows the reduction in bandwidth over successive frames for various values of $\gamma_2$ going from a best possible quality of 41.08 dB to a worst possible quality of 31.55 dB. The behavior is illustrated for two sequences with different levels of complexity: "ball of wool" and "family portrait". Each control step corresponds to the duration of a single video frame, which is 33 ms for our tests. Picking a $\gamma_2$ value of 0.4 results in a fairly quick reduction in the source bit rate with a very low likelihood of packet losses.

The choice of the value of $\gamma_1$ determines how rapidly existing sources react to an increase in capacity. FIGS. 10A and 10B show the reduction in bandwidth over successive frames for various values of $\gamma_1$ going from a worst possible quality of 31.55 dB to a best possible quality of 41.08 dB. In general, it is desirable to react to an increase in available bandwidth more slowly than to a decrease in bandwidth because the penalty of slow reaction is only a slight reduction in network utilization specially if changes in network bandwidth due to connection termination or scene changes occur on time scales of seconds rather than milliseconds. Reasonable values of $\gamma_1$ are in the range of 0.1.

The choice of the thresholds $T_{c-1}$ and $T_{1-u}$ determines the operating regime of a bottleneck link. Higher values of $T_{c-1}$ increase the average utilization but also increase the likelihood of packet loss. Higher values of $T_{1-u}$ are likely to increase the average utilization but lead to more frequent fluctuation in the quality seen by streams. The optimal choice of these parameters depends on the traffic patterns expected in the network.

Choice of Congestion Indicator

For the earlier tests, the bottleneck link utilization was used to detect and signal changes in network state. Queue occupancy is also often used in a similar role. The fourth set of tests was designed to examine if the use of queue occupancy to indicate network congestion affects the performance of the control mechanism 30 of present invention, fair bandwidth sharing. In this set of tests, the same scenario as in Test 1 was used but the unloaded, loaded and congested states were defined in terms of queue occupancy levels. $T_{c-1}$ and $T_{1-u}$ are 50 Kbytes and 10 Kbytes and the aggregate buffer size is 200 Kbytes.

FIGS. 9A and 9B compare the performance of the fair bandwidth sharing scheme using either queue occupancy or link utilization to detect congestion. The results show that the use of queue occupancy also results in fair service with almost equal quality across all the connections. Moreover, the average SNR values are almost 1 dB higher than when link utilization is used to detect congestion—this is because the average bottleneck link utilization with the former approach is about 89% vs. 79% with the latter approach. However, the use of queue occupancy as a congestion indicator results in large oscillations in the queue occupancy at the bottleneck and the source bit rates: this causes the image quality to fluctuate continuously in a manner similar to FIGS. 6A, 6B and 6C. This is a result of the interaction of 2 factors: FIFO scheduling at network switches and aggregate queue occupancy based feedback information and is extremely difficult to eliminate without excessive damping of the control mechanism used to adapt source behavior.

A new scheme for rate adaptation of video sources using network feedback in combination with simple FIFO scheduling at network switches results in high link utilization and graceful degradation in signal quality under overload conditions. The image quality of multiple video sources, running the fair bandwidth sharing scheme in an asynchronous and distributed manner, converges to within 0.5–1.0 dB of each other, following changes in the available network bandwidth. In contrast, with the RJ scheme the SNR values converge to levels that differ by as much as 3.5 dB. The present invention, fair bandwidth sharing, in combination with simple FIFO scheduling at network switches results in high link utilization and graceful degradation in quality under overload conditions.

Numerous modifications and alternative embodiments of the invention will be apparent of those skilled in the art in view of the foregoing description. Accordingly, this description is to be construed as illustrative only and is for the purpose of teaching those skilled in the art the best mode of caring out the invention. Details of the structure may be varied substantially without departing from the spirit of the invention and the exclusive use of all modifications which come within the scope of the appended claim is reserved.

What is claimed is:

1. In a packet data network an apparatus for adjusting video image quality comprising:

network load detection means for detecting a network load, said network load having an uncongested state, a loaded state, and a congested state; and video encoding control circuit adjusting a video quality to a target video quality, said target video quality increasing when said network load is in said uncongested state and said target video quality decreasing when said network load is in said congested state;

wherein said video quality is a peak mean squared error between an uncompressed image and a corresponding decoded image.

2. The apparatus as recited in claim 1 further comprising a circuit for computing said target video quality when said network load is in said uncongested state in response to a first control equation, said first control equation is $$E_{target} = E_{current} - \gamma_1 \cdot (E_{current} - E_{min})$$

where $E_{target}$ is said target video quality, $E_{current}$ is a peak mean squared error measure of video quality of a current frame, $\gamma_1$ is a first predetermined constant, and $E_{min}$ is a predetermined minimum peak mean squared error.

3. The apparatus as recited in claim 1 further comprising a circuit for computing said target video quality when said network load is in said congested state in response to a second control equation, said second control equation is $$E_{target} = E_{current} + \gamma_2 \cdot (E_{max} - E_{current})$$

where $E_{target}$ is said target video quality, $E_{current}$ is a peak means squared video, quality of a current frame, $\gamma_2$ is a second predetermined constant, and $E_{max}$ is a predetermined maximum peak means squared error.

4. In a packet data network an apparatus for adjusting video image quality comprising:

network load detection means for detecting a network load, said network load having an uncongested state, a loaded state, and a congested state; and video encoding control circuit adjusting a video quality to a target video quality, said target video quality increasing when said network load is in said uncongested state and said target video quality decreasing when said network load is in said congested state;

wherein said network load detection means for detecting a network load, said network load having an uncongested state, a loaded state, and a congested state comprises a circuit for detecting a forward explicit congestion notification bit.

5. The apparatus as recited in claim 4 wherein said network load is related to a plurality of said forward explicit congestion notification bit during a predetermined time interval.

6. In a packet data network a method for adjusting video image quality comprising the steps of:

detecting a state of a network load, said network load having an uncongested state, a loaded state, and a congested state; and adjusting a video quality to a target video quality, said target video quality increasing when said state of said network load is said uncongested state and said target video quality decreasing when said network load is said congested state;

wherein said video quality is a peak mean squared error between an uncompressed image and a corresponding decoded image.

7. The method as recited in claim 6 further comprising the step of computing said target video quality when said network load is in said uncongested state in response to a first control equation, said first control equation is $$E_{target} = E_{current} - \gamma_1 \cdot (E_{current} - E_{min})$$

where $E_{target}$ is said target video quality, $E_{current}$ is a peak means squared video quality of a current frame, $\gamma_1$ is a first predetermined constant, and $E_{min}$ is a predetermined minimum peak means squared error.

8. The method as recited in claim 6 further comprising the step of computing said target video quality when said network load is in said congested state in response to a second control equation, said second control equation is $$E_{target} = E_{current} + \gamma_2 \cdot (E_{max} - E_{current})$$

where $E_{target}$ is said target video quality, $E_{current}$ is a peak means squared video quality of a current frame, $\gamma_2$ is a second predetermined constant, and $E_{max}$ is a predetermined maximum peak means squared error.

9. In a packet data network a method for adjusting video image quality comprising the steps of:

detecting a state of a network load, said network load having an uncongested state, a loaded state, and a congested state; and adjusting a video quality to a target video quality, said target video quality increasing when said state of said network load is said uncongested state and said target video quality decreasing when said network load is said congested state;

wherein said network load detection means for detecting a network load, said network load having an uncongested state, a loaded state, and a congested state comprises a circuit for detecting a forward explicit congestion notification bit.

10. The method as recited in claim 9 wherein said network load is related to a plurality of said forward explicit congestion notification bit during a predetermined time interval.

\* \* \* \* \*